(12) United States Patent
Komar

(10) Patent No.: US 7,008,910 B2
(45) Date of Patent: Mar. 7, 2006

(54) RUST INHIBITOR

(76) Inventor: John P. Komar, 9807 Memorial Hwy., Tampa, FL (US) 33601

( * ) Notice: Subject to any disclaimer, the term of this patent is extended or adjusted under 35 U.S.C. 154(b) by 3 days.

(21) Appl. No.: 10/812,820

(22) Filed: Mar. 30, 2004

(65) Prior Publication Data

US 2004/0235695 A1     Nov. 25, 2004

Related U.S. Application Data

(60) Provisional application No. 60/472,960, filed on May 23, 2003.

(51) Int. Cl.
    *C11D 17/00*     (2006.01)
(52) U.S. Cl. .............. 510/201; 510/202; 510/206; 510/207; 510/208; 510/210; 252/70; 252/180; 422/12

(58) Field of Classification Search ............. 510/201, 510/202; 252/70, 180; 422/12
See application file for complete search history.

(56) References Cited

U.S. PATENT DOCUMENTS 4,168,292 A *   9/1979   Redmore et al. ............. 422/12
6,632,291 B1 *   10/2003   Rabon et al. ................. 134/26

\* cited by examiner

*Primary Examiner*—Necholus Ogden
(74) *Attorney, Agent, or Firm*—Arthur W. Fisher, III

(57) ABSTRACT

An aqueous non-toxic biorational or environmentally safe composition to reduce or inhibit corrosion, rust and scale on metal surfaces comprising effective amounts of sorbic acid, salts of sorbic acid and/or derivatives thereof and a variety of hydrocarbons, esters, acids, alcohols and/or saponified fatty acids or combinations thereof derived from beeswax, vegetable waxes and/or derivatives thereof.

17 Claims, No Drawings

RUST INHIBITOR

CROSS REFERENCE APPLICATION

This is a non-provisional patent application of provisional patent application Ser. No. 60/472,960 filed May 23, 2003.

BACKGROUND OF THE INVENTION

1. Field of the Invention

An environmentally safe composition to reduce the formation or rust, corrosion and scale on metal surfaces.

2. Description of the Prior Art

Sorbic acid and derivatives thereof are known to have anti-corrosive properties. In the past metal treatments for flash rust have generally required that the rust inhibitor or treatment composition be removed prior to application of the top coat. The present invention not only acts as an anti-corrosive composition but allows the treated surface to accept a finish top coat after treatment without the additional step and expense of removing the anti-corrosive composition.

In addition, metal surfaces can be treated to convert active sites on the surface to a passive condition. Such conversion coatings include phosphates and chromates which are applied usually by dipping metals to be treated in conversion coating solutions. Unfortunately, such conversion coatings often present environmental or health hazards.

SUMMARY OF THE INVENTION

This invention relates to an aqueous non-toxic anti-corrosive rust inhibiting composition comprising effective amounts of sorbic acid, salts of sorbic acid and/or derivatives thereof such as potassium sorbate and extracts from beeswax, vegetable wax and/or derivatives thereof to reduce the formation of rust, corrosion and scale on metal surfaces and a method for producing this composition.

Sorbic acid is a short chain fatty acid has been known to have an anti-corrosive properties. The present invention not only performs the function of an anti-corrosive composition but additionally allows the treated surface to readily accept a finish top coating after treatment. Corrosion inhibitors based on this aqueous non-toxic technology act as short term inhibitors formulated to minimize the effects of flash rust and corrosion when working with both ferrous and non-ferrous metals. The coating is not intended to be a final top coat or permanent barrier. That is, the aqueous non-toxic anti-corrosive rust inhibiting composition inhibits rust in the longer term on metals when applied over substantially the entire metal surface prior to painting or otherwise coating the surface of the metal.

In terms of the final composition, only a fraction of the beeswax or vegetable wax is retained. Carbon chains C24 and smaller comprise the majority of fatty acids retained in the composition. Phenolics, acids and other compounds are also extracted from the beeswax or vegetable wax. In addition, high-melting point paraffins and other components that interfere with subsequent top coating are removed during the manufacturing process.

The rust inhibitor of the present invention thus contains a variety of hydrocarbons, esters, acids, alcohols and saponified fatty acids derived from beeswax or vegetable waxes.

In addition to use as a flash rust inhibitor, other applications of the composition include the submerging of the metal materials to be preserved in the composition. Also, cooling systems, heat transfer systems, piping, tanks, and long term storage of ferrous and non-ferrous components can be treated with the composition.

Significantly the composition of the present invention does not contain volatile organic chemicals.

The invention accordingly comprises the features of construction, combination of elements, and arrangement of parts which will be exemplified in the construction hereinafter set forth, and the scope of the invention will be indicated in the claims.

DESCRIPTION OF THE PREFERRED EMBODIMENT

The present invention relates to an aqueous non-toxic biorational or environmentally safe composition to reduce or inhibit the formation of corrosion, rust and scale on metal surfaces and a method for producing the composition.

The composition has numerous applications including as a flash rust inhibitor before paints and coatings are applied to the metal surface, as a rinse to remove harmful chlorides, as a dip in tanks for steel parts, cars and the like to clean and remove corrosive salts, sand and organic material from surfaces, as a paint additive, as a water blast or jet blast application to strip paints, scale and rust with flash rust protection, as a concrete/rebar corrosion protection, as pipe flushing application and as a bird bath application, for aircraft, helicopters, jeeps and the like.

Generally, the composition comprises effective amounts of components or constituents including from about 0.004 percent beeswax to about 0.40 percent beeswax, preferably about 0.007 percent beeswax, from about 0.30 percent sorbic acid and/or potassium sorbate to about 3.50 percent sorbic acid and/or potassium sorbate, preferably about 0.325 percent sorbic acid and/or potassium sorbate with the balance purified water, all by weight.

In addition, from about 0.00007 percent surfactant to about 2.0 percent surfactant, preferably about 0.000076 percent surfactant as a flash rust inhibitor and preferably about 2.0 percent as a wash or dip, and from about 0.009 percent fiber to about 0.013 percent fiber, preferably about 0.011 fiber to stabilize the solution or composition for uniform or homogeneous component distribution within the composition, all by weight can be added.

When used as a flash rust inhibitor, the composition comprises effective amounts of components or constituents including from about 0.004 percent beeswax to about 0.01 percent beeswax, preferably about 0.007 percent beeswax, from about 0.30 percent potassium sorbate to about 0.35 percent potassium sorbate, preferably about 0.325 percent potassium sorbate with the balance purified water, all by weight.

The preferred method will need reference to pH as the alkalinity of the product is responsible for extracting many of the components from wax. Alkalinity is derived from the potassium sorbate. As a processing aid potassium hydroxide may be used to reach the target pH and level of alkalinity required to saponify the required fatty acids. Additionally, sorbic acid may be used and potassium hydroxide or other suitable alkalizer used to produce the same end products of potassium sorbate or its various salts and saponified wax derivatives.

The preferred method for producing the composition of the present invention as a flash rust inhibitor comprises heating about 10.7 percent purified water to from at least about 175° F. to about 185° F.; preferably about 180° F. adding about 0.007 percent beeswax and mixing for about five (5) minutes; adding about 0.325 percent potassium sorbate and mixing for about ten (10) minutes, transferring the composition to a product container and adding about 89 percent purified water.

The chemical properties of the flash rust inhibitor composition includes a pH of about 7.0 to about 10.0 with a preferred range of about 8.0 to about 9.0 and a most preferred pH of about 8.5 and conductivity of from about 1.70 ms/cm to about 2.30 ms/cm, preferably about 2.00 ms/cm.

For use as a bath or dip, the composition comprises effective amounts of components or constituents including from about 0.02 percent beeswax to about 0.1 percent beeswax, preferably about 0.062 percent beeswax, from about 2.50 percent potassium sorbate to about 3.50 percent potassium sorbate, preferably about 2.957 percent potassium sorbate with the balance purified water, all by weight.

The preferred method for producing the composition of the present invention as a bath or dip comprises adding about 96.98 percent purified water from at least about 175° F. to about 185, preferably about 180° F.; adding about 0.062 percent beeswax and mixing for about five (5) minutes; adding about 2.957 percent potassium sorbate and mixing for about ten (10) minutes and transferring the composition to a product container The chemical properties of the bath or dip composition include a pH of about 7.0 to about 10.0 with a preferred range of about 8.0 to about 9.0 and a most preferred pH of about 8.5 and conductivity of from about 14.20 ms/cm to about 16.20 ms/cm, preferably about 15.20 ms/cm.

When used as a paint preservative or additive, the composition comprises effective amounts of components or constituents including from about 0.30 percent beeswax to about 0.40 percent beeswax, preferably about 0.350 percent beeswax, from about 17.00 percent potassium sorbate to about 25.00 percent potassium sorbate, preferably about 21.035 percent potassium sorbate with the balance purified water, all by weight.

The preferred method for producing the composition of the present invention used as a paint preservative or additive comprises heating about 78.61 percent purified water from at least about 175° F. to about 185° F., preferably about 180° F.; adding about, 0.3580 percent beeswax and mixing for about 5 minutes, adding about 21.035 percent potassium sorbate and mixing for about ten (10) minutes and transferring the composition to a product container.

The chemical properties of the paint preservative or additive, includes a pH of about 7.0 to about 10.0 with a preferred range of about 9.0 to about 10.0 and a most preferred pH of about 9.3 and conductivity of from about 60 ms/cm to about 80 ms/cm preferably about 70 ms/cm.

The composition acts in several ways to inhibit corrosion. It is the combined effect that enhances the functional use or application of the composition.

As an anti-oxidant the composition scavenges oxygen which would under normal condition promote corrosion on ferrous and non ferrous materials. By forming an oxygen barrier the material effectively eliminates or reduces corrosion in the short term. As oxygen scavenging ability is depleted the ferrous and non ferrous materials will begin to show signs of corrosion.

The ions of the short chain fatty acids react with the active cathodic sites on the metal surfaces to neutralize the active sites. This action extends the effectiveness of the composition as a rust inhibitor. Without this activity, the effectiveness of the composition would be greatly reduced as the oxygen scavenging function is depleted rapidly.

In particular, the rust inhibitor of the present invention contains positively and negatively charged components which readily combine with positively and negatively charged sites on the surface of the treated metals. The effect is that corrosion potential is reduced. In other words, the surface of mild steel is passivated by acting on the cathodic (active) sites on the surfaces with potassium ions and other anodic materials. The surface of mild steel is passivated by acting on the anodic (active) sites on a given metals surface with potassium ions and other cathodic materials.

In addition to these properties, the saponified wax further compliments the other functions and aids in forming a layer less than about 350 nanometers in thickness that can be successfully coated with a finishing material such as paint or plating. The extract from wax contains compounds known to be beneficial to coating adhesion and the residual wax components are not detrimental to product finishing. Further, the saponification of wax fatty acids produces water soluable compounds that dissolve when contacted with water or other polar solvent. This allows for top coating without preliminary removal of the soluable compounds.

It will thus be seen that the object set forth above, among those made apparent from the preceding description are efficiently attained and since certain changes may be made in the above construction without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An aqueous non-toxic environmentally safe composition to reduce or inhibit corrosion, rust and scale on metal surfaces comprising effective amounts of sorbic acid, salts of sorbic acid and/or derivatives thereof and at least one wax selected from the group consisting of hydrocarbons, esters, acids, alcohols and/or saponified fatty acids and combinations thereof, wherein said effective amounts include from about 0.004 percent beeswax to about 0.40 percent beeswax, from about 0.30 percent potassium sorbate to about 3.50 percent potassium sorbate with the balance purified water, all by weight.

2. An aqueous non-toxic environmentally safe composition to reduce or inhibit corrosion, rust and scale on metal surfaces as a flash rust inhibitor comprising effective amounts of sorbic acid, salts of sorbic acid and/or derivatives thereof and at least one wax selected from the group consisting of hydrocarbons, esters, acids, alcohols and/or saponified fatty acids and combinations thereof, wherein said effective amounts include from about 0.004 percent beeswax to about 0.01 percent beeswax, from about 0.30 per cent potassium sorbate to about 0.35 percent potassium sorbate, with the balance purified water, all by weight.

3. An aqueous non-toxic environmentally safe composition to reduce or inhibit corrosion, rust and scale on metal surfaces as a bath or dip comprising effective amounts of sorbic acid, salts of sorbic acid and/or derivatives thereof and at least one wax selected from the group consisting of hydrocarbons, esters, acids, alcohols and/or saponified fatty acids and combinations thereof, wherein said effective amounts includes from about 0.02 percent beeswax to about 0.1 percent beeswax, from about 2.50 percent potassium sorbate to about 3.50 percent potassium sorbate, with the balance purified water, all by weight, having a pH of about 8.0 to about 9.0 and conductivity of from about 14.20 ms/cm to about 16.20 ms/cm.

4. The aqueous non-toxic environmentally safe composition to reduce or inhibit corrosion, rust and scale on metal surfaces as a paint preservative or additive comprising effective amounts of sorbic acid, salts or sorbic acid and/or derivatives thereof and at least one wax selected from the group consisting of hydrocarbons, esters, acids, alcohols and/or saponified fatty acids and combinations thereof, wherein said effective amounts includes from about 0.30 percent beeswax to about 0.40 percent beeswax and from about 17.00 percent potassium sorbate to about 25.00 percent potassium sorbate, with the balance purified water, all by weight having a pH of about 7.0 to about 10.0 and a conductivity of from about 60 ms/cm to about 80 ms/cm.

5. The aqueous non-toxic environmentally safe composition of claim 1 wherein said effective amounts include about 0.007 percent beeswax, about 0.325 percent potassium sorbate with the balance purified water, all by weight.

6. The aqueous non-toxic environmentally safe composition of claim 5 further includes about 0.000076 percent surfactant when used as a flash rust inhibitor.

7. The aqueous non-toxic environmentally safe composition of claim 1 further includes from about 0.00007 percent surfactant to about 2.0 percent surfactant and from about 0.009 percent fiber to about 0.013 percent fiber to stabilize said composition for uniform or homogeneous component distribution within said composition, all by weight.

8. The aqueous non-toxic environmentally safe composition of claim 1 wherein said composition forms a layer less than about 350 nanometers in thickness.

9. The aqueous non-toxic environmentally safe composition of claim 2 wherein said effective amounts include about 0.007 percent beeswax, about 0.325 percent potassium sorbate with the balance purified water, all weight.

10. The aqueous non-toxic environmentally safe composition of claim 9 wherein said composition includes a pH of about 8.5.

11. The aqueous non-toxic environmentally safe composition of claim 10 wherein said composition includes conductivity of about 2.00 ms/cm.

12. The aqueous non-toxic environmentally safe composition of claim 9 wherein said composition includes a pH of from about 7.0 to about 10.0.

13. The aqueous non-toxic environmentally safe composition of claim 12 wherein said composition includes conductivity is from about 1.70 ms/cm to about 2.30 ms/cm.

14. The aqueous non-toxic environmentally safe composition of claim 2 wherein said composition forms a layer less than about 350 nanometers in thickness.

15. The aqueous non-toxic environmentally safe composition of claim 3 wherein said effective amounts includes about 062 percent beeswax and about 2.957 percent potassium sorbate with the balance purified water, all by weight.

16. The aqueous non-toxic environmentally safe composition of claim 3 wherein said composition includes a pH of about 8.5.

17. The aqueous non-toxic environmentally safe composition of claim 4 wherein composition forms a layer less than about 350 nanometers in thickness.

* * * * *